United States Patent
Grossman et al.

(10) Patent No.: US 8,370,253 B1
(45) Date of Patent: Feb. 5, 2013

(54) METHOD AND APPARATUS FOR CREDIT BROKERING FOR POINT-OF-SALE LEASING

(76) Inventors: David Daniel Grossman, Palo Alto, CA (US); F. Neil Lamka, Seattle, WA (US); Matthew L. Seaburn, San Carlos, CA (US)

( * ) Notice: Subject to any disclaimer, the term of this patent is extended or adjusted under 35 U.S.C. 154(b) by 1210 days.

(21) Appl. No.: 09/905,727

(22) Filed: Jul. 12, 2001

(51) Int. Cl.
G06Q 40/00 (2012.01)

(52) U.S. Cl. ............................. 705/38; 705/35

(58) Field of Classification Search ............... 705/35, 705/38
See application file for complete search history.

(56) References Cited

U.S. PATENT DOCUMENTS

| | | |
|---|---|---|
| RE29,796 E | 5/1971 | Yamamoto et al. |
| 4,736,294 A | 4/1988 | Gill et al. |
| 4,774,664 A | 9/1988 | Campbell et al. |
| 4,989,141 A | 1/1991 | Lyons et al. |
| 5,025,138 A | 6/1991 | Cuervo |
| 5,025,373 A | 6/1991 | Keyser, Jr. et al. |
| 5,198,642 A | 3/1993 | Deniger |
| 5,218,539 A | 6/1993 | Elphick et al. |
| 5,220,501 A | 6/1993 | Lawlor et al. |
| 5,231,571 A | 7/1993 | D'Agostino |
| 5,239,462 A | 8/1993 | Jones et al. |
| 5,262,941 A | 11/1993 | Saladin et al. |
| 5,272,623 A | 12/1993 | Grubb et al. |
| 5,274,547 A | 12/1993 | Zoffel et al. |
| 5,383,113 A | 1/1995 | Kight et al. |
| 5,600,835 A | 2/1997 | Garland et al. |
| 5,611,052 A | 3/1997 | Dykstra et al. |
| 5,699,527 A | 12/1997 | Davidson |
| 5,706,497 A | 1/1998 | Takahashi et al. |
| 5,774,882 A | 6/1998 | Keen et al. |
| 5,797,133 A | 8/1998 | Jones et al. |
| 5,870,721 A | 2/1999 | Norris |
| 5,878,403 A | 3/1999 | DeFrancesco et al. |
| 5,930,776 A | 7/1999 | Dykstra et al. |
| 5,940,811 A | 8/1999 | Norris |
| 5,940,812 A * | 8/1999 | Tengel et al. .................. 705/38 |
| 5,966,699 A | 10/1999 | Zandi |
| 5,978,797 A | 11/1999 | Yianilos |
| 5,995,947 A | 11/1999 | Fraser et al. |
| 6,009,424 A | 12/1999 | Lepage et al. |
| 6,014,645 A | 1/2000 | Cunningham |
| 6,029,149 A | 2/2000 | Dykstra et al. |
| 6,088,686 A * | 7/2000 | Walker et al. ................. 705/38 |
| 6,112,190 A | 8/2000 | Fletcher et al. |
| 6,745,188 B2 * | 6/2004 | Bradburn ...................... 707/10 |

(Continued)

FOREIGN PATENT DOCUMENTS

WO WO 26831 10/1999

OTHER PUBLICATIONS

Waterways Sails Into e-Commerce with Web Site Designed by Millennium Communications. Pr Newswire. New York. Apr. 3, 2001. (2 pages).*

(Continued)

Primary Examiner — William Rankins
(74) Attorney, Agent, or Firm — Ohlandt, Greeley, Ruggiero & Perle, LLP.

(57) ABSTRACT

A computerized method for online brokering of multiple leasing products from multiple providers is provided. The method includes determining the creditworthiness of a Buyer, and determining whether or not to offer a lease, based on the specific criteria provided by multiple credit providers.

17 Claims, 9 Drawing Sheets

U.S. PATENT DOCUMENTS

| | | | | |
|---|---|---|---|---|
| 6,980,960 | B2 * | 12/2005 | Hajdukiewicz et al. | 705/14 |
| 7,139,731 | B1 * | 11/2006 | Alvin | 705/35 |
| 7,340,433 | B1 * | 3/2008 | Kay et al. | 705/38 |
| 7,349,860 | B1 * | 3/2008 | Wallach et al. | 705/4 |
| 7,356,503 | B1 * | 4/2008 | Johnson et al. | 705/38 |
| 7,383,233 | B1 * | 6/2008 | Singh et al. | 705/80 |
| 2002/0038292 | A1 * | 3/2002 | Quelene | 705/80 |
| 2002/0040339 | A1 * | 4/2002 | Dhar et al. | 705/38 |
| 2002/0072927 | A1 * | 6/2002 | Phelan et al. | 705/1 |
| 2002/0138414 | A1 * | 9/2002 | Baker, IV | 705/38 |

OTHER PUBLICATIONS

Brown, Jeanette. "Leasing companies offer credit where credit is due". Computer Reseller News. Manhasset: Oct. 17, 1994, Iss. 600, p. 119. (4 pages from ProQuest).*

PR Newswire. "Summit Quick Lease offers streamlined approval for business equipment leasing; can provide same-day credit decisions up to $75,000". New York: Apr. 8, 1999. (2 pages from ProQuest).*

American Banker. "credit: AT&T reaches out to customers via the web credit applications submitted, scored and answered on-line". New York, NY: Sep. 8, 1997. vol. 162, Iss. 172; p. 34. (2 pages from ProQuest).*

Leasing companies offer credit where credit is due, Brown, Jeannette, Computer reseller news, Oct. 17, 1994.*

Brad Schultz "The Automated Loan Officer", Bank Systems and Technology, pp. 22, 23, 27, 28 Apr. 1999.

Alsop, S., "The First Powerhouse Bank of the Virtual World," Fortune, Sep. 7, 1998 pp. 159-160.

Butera, G., et la., "Parmenide: An Expert System for Assessing the Credit of Industrial Clients," International Journal of Expert Systems, vol. 3, No. 1, 1990 pp. 73-85.

Darlin, D., "Try E-Banking," Forbes, Jan. 13, 1997, pp. 68-69.

Hirsch, N., "Loan Shark," PC Magazine, Oct. 7, 1997, pp. 40.

Nystrom, W., "Automated Mortgage Financing," Untied States Banker, Feb. 1989, pp. 62.

Soundex-"What is the SOUNDEX?" [7 paragraphs] downloaded http://www.firstct.com/fv/soundex.html Feb. 7, 2000.

Starita, L., "The Net Result," Mortgage Banking, Oct. 1999, pp. 161-162.

Wu, Soushan, et al., "A Framework of PC Bank Loan DSS," IEEE, 1992, Computer Society Press, Twenty-Fifth Hawaii International Conference on System Sciences, vol. III: Information Systems, as edited by Nunamaker, Jay F., Jr. pp. 277-284.

Zuckerman, S., "NextCard Nears Approval on Key Patent," [13 paragraphs] San Francisco Chronicle, Feb. 17, 2000 Online: http://www.sfgate.com/cgi-bin/article.cgi?file=/chronicle/archive/2000/02/17/BU96855.DTL. Accessed Jul. 17, 2000.

* cited by examiner

METHOD AND APPARATUS FOR CREDIT BROKERING FOR POINT-OF-SALE LEASING

RELATED APPLICATIONS

This application is related to a co-pending U.S. Application entitled "Online Credit Services Brokering," application Ser. No. 09/549,822, filed Apr. 12, 2000, and incorporates that application by reference.

FIELD OF THE INVENTION

This invention relates generally to automated systems for credit approval, and more particularly to an interactive, online credit brokering service integrated with a point-of-sale leasing system.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000-2001, LiveCapital, All Rights Reserved.

BACKGROUND OF THE INVENTION

On the Internet, there are many instances of online lending and sellers that permit a buyer to lease or purchase an item. Leases are an established means of financing many purchases, particularly leasable items like computer systems, and other large equipment. Technically, in most leases, the Seller sells the goods to the Lessor, who then lends the goods to the Buyer. Thus, the Lessor retains, or obtains, ownership of the goods, while the actual use of the goods is made by the Buyer. For simplicity, the term "Buyer" will be used to refer to the end user, while the term Lessor will be used to refer to the actual purchaser of the items.

A Buyer may arrange a lease in advance of or at the time of purchase. In establishing a lease, Lessor generally evaluates the credit-worthiness of the Buyer, to determine whether or not to offer a lease, and what leasing terms to offer. Leasing terms may include a maximum value leased, lease duration, lease factor (interest rate), options for initial buydown payment, purchase options, and residual value. The Lessor may offer many choices, and permit the Buyer to select the terms and options that fit the Buyer's needs.

A Seller may offer items that are leasable, conditionally leasable, or non-leasable. Conditionally leasable goods are those that are individually nonleasable, but may be leased as an adjunct to a leasable good. For example, copy paper may be conditionally leasable, if the purchase of the copy paper is coupled to the lease of a copy machine. For such conditionally leasable goods, there may be a ratio, i.e., the conditionally leasable goods may be 20% of the total leasing price. Generally, each Lessor may have specific rules for classifying goods as leasable, conditionally leasable, or non-leasable for this purpose.

SUMMARY OF THE INVENTION

The above-mentioned issues are addressed by the present invention, which will be understood by reading and studying the following specification.

A computerized method for online brokering of multiple leasing products from multiple providers is provided. The method includes determining the creditworthiness of a Buyer, and determining whether or not to offer leasing options, based on the specific criteria provided by multiple credit providers.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
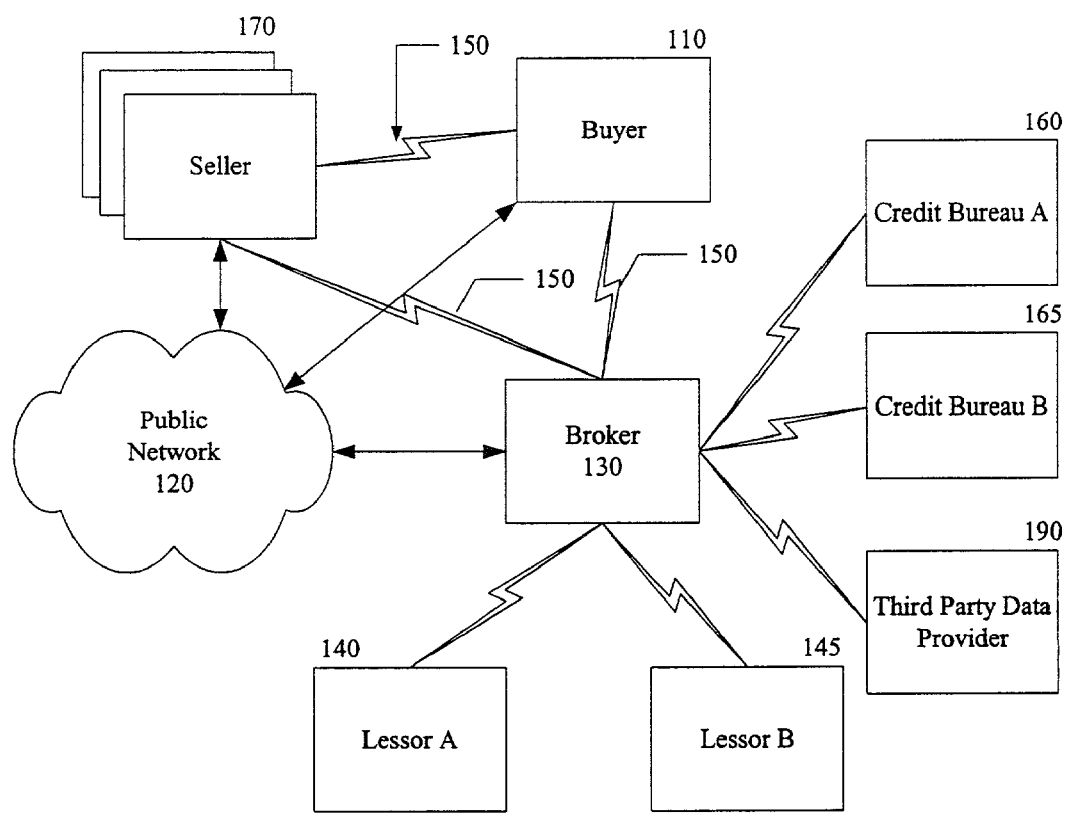
FIG. 1 is an overview diagram of networked client and server computers for practicing one embodiment of the invention.

FIG. 1 is an overview diagram of networked client and server computers for practicing one embodiment of the invention. FIG. 1 illustrates a public wide area network 120, such as the Internet, through which a buyer 110 can connect to a server computer for a seller 170. The seller 170 permits the buyer 110 to purchase various items. For example, the seller 170 may permit the buyer 110 to purchase a computer system, or other big-ticket item.

For one embodiment, the buyer 110 may not connect directly to the seller 170. Rather, the buyer 110 may contact a sales representative of the seller 170, who then enters data on the buyer's behalf. For simplicity, the discussion below illustrates the buyer 110 performing various activities, such as entering data and receiving data. However, it is to be understood that these activities may be intermediated by a sales representative, who would pass this information on to seller 170. The use of sales representatives, who can fill out computerized forms, make purchasing selections, etc. on a buyer's behalf is known in the art. Furthermore, it is known in the art that if there is a sales representative who interacts with various clients or buyers, that sales representative may be able to view account information for each of the multiple clients. For simplicity, this is not shown.

The buyer 110 may choose to apply for credit (e.g. lease) to pay for purchases made from seller 170. The seller 170 may then refer or forward buyer 110 to broker 130, to handle the credit-portion of the transaction. For one embodiment, seller 170 may interact with broker 130 and/or buyer 110.

For one embodiment, seller 170 may pass information about buyer 110 to broker 130 either via the public network 120 or via a private network 150. The buyer 110 may start interacting with broker 130 at one of three States. The first state is a no-sale no-lease state, which is applicable when buyer 110 wishes to establish a lease in advance of purchasing. This comprises the process of buyer registration, credit application, initial lease approval, and preliminary preparation of a purchase order (P/O).

A second state is reached when there is a sale, but no lease. This is applicable when the buyer 110 wishes to obtain a lease at the time of purchasing. This comprises the same process as State 1 above. If a lease is approved, then it comprises the same process as State 3 below.

State 3 is reached when there is a current sale pending, and there is a pre-existing lease. This is applicable when the buyer 110 wishes to use an existing lease to obtain a new purchase. It comprises buyer verification, shopping cart sorting, P/O completion, buyer history monitoring, incremental lease approval, lease limit drawdown accounting, delivery and acceptance of goods, and document management.

Each of these States has associated processes. Thus, when the broker 130 receives a connection from the buyer 110, broker 130 first determines the State.

The broker 130 is connected to credit providers (lessors) A 140 and B 145 represented by the broker 130, and to credit bureaus A 160 and B 165 through private networks 150, virtual private network 150, public network 120, or another type of connection mechanism. Messages containing various types of data are transmitted between the client computer for buyer 110 and the server computer for the broker 130 using any of the protocols supported by the underlying public area network 120. For one embodiment, messages to the buyer 110 may be transmitted through seller 170 as is known in the art. Similarly, messages are transmitted between the server computer for the broker 130 and server computers for the lessors A 140, B 145, credit bureaus A 160 and B 165, and a third party data provider 190, using a protocol appropriate for the corresponding underlying private network or public network 120. Depending on the protocol, the messages can be transmitted as a single data packet, multiple data packets, or as a data stream.

Figure 2:
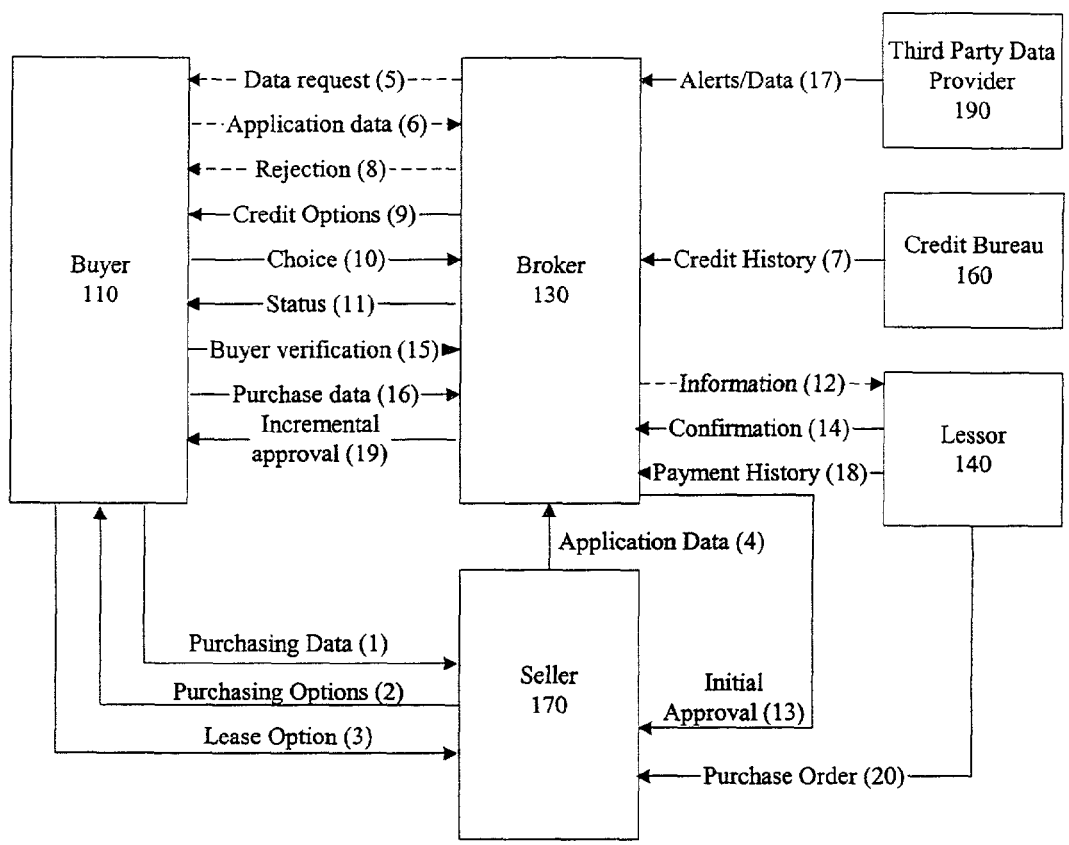
FIG. 2 is a diagram illustrating a sequence of messages exchanged among the client and server computers.

FIG. 2 illustrates a sequence of such messages exchanged between the client system for the buyer 110, server(s) for the seller 170, and the server for the online broker 130 to perform the transaction.

The transaction may begin when buyer 110 submits message 1 containing purchasing data to seller 170. While illustrated and described in this section in terms of single messages for ease of explanation, the process encompasses the use of multiple data messages corresponding to portions of data, such as pages of a selection process, and pages of a credit application.

Seller 170 presents the buyer 110 with the purchasing options available for the item(s) selected by buyer 110, shown as message 2. For one embodiment, purchasing options may include leasing or purchasing using credit. Alternatively, the buyer may select other types of purchasing options, e.g. purchasing by a direct payment, etc. If the buyer 110 decides to purchase the item(s) using a lease or loan, a lease/loan selection message (shown as message 3) is returned to the seller 170. The seller 170 does not handle the credit options itself. Rather, in response to receiving the lease/loan selection, the seller 170 forwards data to broker 130 (shown as message 4).

For one embodiment, the seller 170 attaches a thin client identification (client ID) to the transaction either at this point, or upon initialization of the buying process. The client ID is attached to the data transmitted to the broker 130, and is used by the broker 130 whenever data about this transaction is sent to the seller 170. For one embodiment, the broker 130 may use this for its internal tracking of the transaction as well. For another embodiment, the broker 130 may have a different internal identification number, and may only use this client ID for correspondence with the seller 170. For another embodiment, the seller 170 may generate a client ID and return it to the seller 170 upon receiving the data (message 4) from the seller 170.

For one embodiment, if the purchasing is being done using a plurality of web pages, the seller 170 may open another window for the buyer 110, connecting the buyer 110 with broker 130. For another embodiment, the seller 170 may simply forward the buyer 110 to broker 130. For another embodiment, seller 170 may act as an intermediary between the broker 130 and buyer 110. In that instance, the messages shown between broker 130 and buyer 110 (e.g. messages 5 through 10) are passed by the broker 130 through the seller 170, to the buyer 110. However, this is not shown for simplicity.

The online credit approval process begins when seller 170 submits message 4 containing application data to the broker 130. This message 4 may include all, or a part, of the data collected by the seller 170 from buyer 110.

In another embodiment, if the buyer 110 seeks an initial lease approval prior to starting a purchase, the process may be initiated at this point, with the buyer 110 directly submitting data to broker 130. For one embodiment, the buyer 110 may submit data using an online application, and select a lease/loan option. In that instance, messages 1-4 do not take place, and the process goes directly to message 5.

The broker 130 determines whether further data is required from the buyer 110 prior to making a credit decision. If further data is required, a data request is passed to the buyer 110, shown as message 5. This is shown as a phantom line, since it is optional, depending on the amount of information transmitted by seller 170.

Buyer 110 responds with application data 6, i.e., message 6. This data may be collected over multiple message exchanges.

Once sufficient amounts of data have been collected from the buyer 110, the broker 130 requests and receives the buyer's 110 credit history from the online credit history databases maintained by credit bureau 160 in message 7. For one embodiment, the broker 130 uses an automated credit scoring system to calculate a credit score for the buyer 110 (or obtains the credit score from one of the credit bureaus 160) and then performs an underwriting evaluation process that compares the buyer's characteristics against the underwriting criteria for the credit options offered by the broker, i.e., all appropriate credit products from all of the credit providers i.e., lessors 140, 145. In this local underwriting process, the broker 130 effectively is bidding on behalf of the credit providers i.e., lessors 140, 145. As an alternative, the broker 130 may send the applications directly to the credit providers i.e., lessors 140, 145 for their remote underwriting decisions. In this case, however, privacy is reduced because buyer information is put into many hands. Additionally, any provider that rejects the application is legally responsible for providing the buyer 110 with adverse action reasons. Also, there are costs to replicate credit reports. For these reasons, if remote underwriting is used, the buyer data should be made anonymous, by removing identifying information such as name, Social Security Number, Federal Tax ID, etc.

A rejection message 8 (shown in phantom) is returned if the buyer 110 does not qualify for any of the credit options offered through the broker 130. For example, the buyer 110 may have a poor credit score or may reside in a state not serviced by any of the credit providers 140, 145 represented by the broker 130. An application may also be rejected because the buyer 110 has submitted more than one application within a certain time or because the application appears fraudulent. These techniques are described in co-pending application Ser. No. 09/299,384, incorporated herein by reference.

When multiple application data messages are used, the message ordering may be slightly different. The broker 130 performs a progressive cumulative filtering process upon receipt of one or more pre-determined messages (illustrated as messages 4 and 5), by comparing the application data cumulatively received against a subset of the underwriting criteria. The broker 130 returns the rejection message 8 as soon as the progressive cumulative filtering determines that the buyer 110 cannot qualify for any of the credit options offered. For one embodiment, the broker 130 returns a rejection message immediately when a prior blocking application exists or upon detecting fraud in the application. Alternatively, the broker 130 may simply flag the application, and allow the lessors 140, 145 to decide whether to offer a lease. Once all the application data is received and the progressive cumulative filtering has not rejected the buyer 110, the credit history is fetched (message 7) and the underwriting evaluation is performed.

If the underwriting evaluation determines that the buyer 110 qualifies for at least one of the offered credit options, the broker 130 responds with a message 9 containing a list of options from which the buyer 110 can choose. The buyer 110 returns its choice in message 10. The buyer 110 may optionally reject all of the available choices. In that instance, the process continues as if the buyer 110 had been rejected.

The broker 130 next determines if the chosen option requires additional information about the buyer 110 and if so, can optionally request and receive the additional information from the buyer 110 (also illustrated as message 5) for local decisioning or for forwarding to the lessor 140 for remote decisioning. Local decisioning refers to having decisioning for multiple providers at a single location, to which decisioning is local, rather than relying on online communications with one or more providers. Remote decisioning refers to having decisioning for each lessor 140, 145 on the lessor's system, which is remote from the broker 130.

If no additional information is required or collected, or the evaluation of the additional data does not disqualify the buyer 110, the broker 130 sends a status message 11 to the buyer 110. The broker 130 also sends all the data required by the chosen lessor to that lessor 140 in message 12. It will be appreciated that the broker 130 can also be viewed as an agent for the buyer 110 when it submits the data to the chosen lessor 140.

If the buyer 110 is disqualified by the additional data collected by the broker 130, the broker 130 sends a revised list of credit options (also illustrated as message 9), assuming there is at least one option remaining. The broker 130 continues presenting credit options to the buyer 110 until the buyer 110 is initially approved (without actual approval) for the chosen lease option, the buyer rejects the available credit options, or no credit options remain for which the buyer 110 qualifies.

For one embodiment, an initial lease approval note, i.e., message 13, is sent to the seller 170, if there is a sales transaction in process. Alternatively, the approval need not be sent.

For one embodiment, lessor 140 sends a confirmation message (message 14) to the broker 130, to confirm that the initial approval has taken place. If there is no sale in process, the process ends at this point, with no further messages being exchanged. The buyer 110 has, at this point, an initial pre-approval for a lease, and can now continue to make a purchase. If, on the other hand, there is a sale in progress, the process continues to use the lease.

If the buyer has a pre-approved lease, he or she may log back into the broker system 130. Buyer verification (message 15) identifies the buyer to the broker 130. The buyer verification message (message 15) may be multiple messages to provide authentication. Methods of authentication, including the use of encryption and cookies, and various other methodologies may be used. Such techniques are known in the art. If the lease use is immediately after the initial lease approval, this message exchange may be skipped.

The broker 130 performs processing such as shopping cart sorting, and purchase order completion after receiving the purchase data (message 16) from buyer 110.

The broker 130 may obtain payment history from lessor 140 (message 18). The payment history, along with alerts or data from third party data providers 190 (message 17) are used to analyze the incremental creditworthiness of buyer 110. The third party data providers 190 may be business magazines or similar sources.

If the buyer 110 is approved based on the payment history and third party information, an incremental lease approval is sent to the buyer 110 (message 19). The purchase order (message 20) is sent to the seller 170 to purchase the items for use by buyer 110. For one embodiment, the purchase order (message 20) may be sent directly from the broker 130 to the seller 170, with a copy sent to the lessor 140. For another embodiment, the lessor 140 may send the purchase order to the seller 170. At this point, document management (not shown) takes place, to verify activity, authenticate the lease, delivery, acceptance of goods, and other follow-up steps. Since these generally are not computerized, they are not shown in FIG. 2.

For one embodiment, when the transaction is completed, the funds may be transferred via automatic funds transfer. For one embodiment, funds may be directly transferred from the lessor 140 to the seller 170 without going through the buyer 110.

Figure 3:
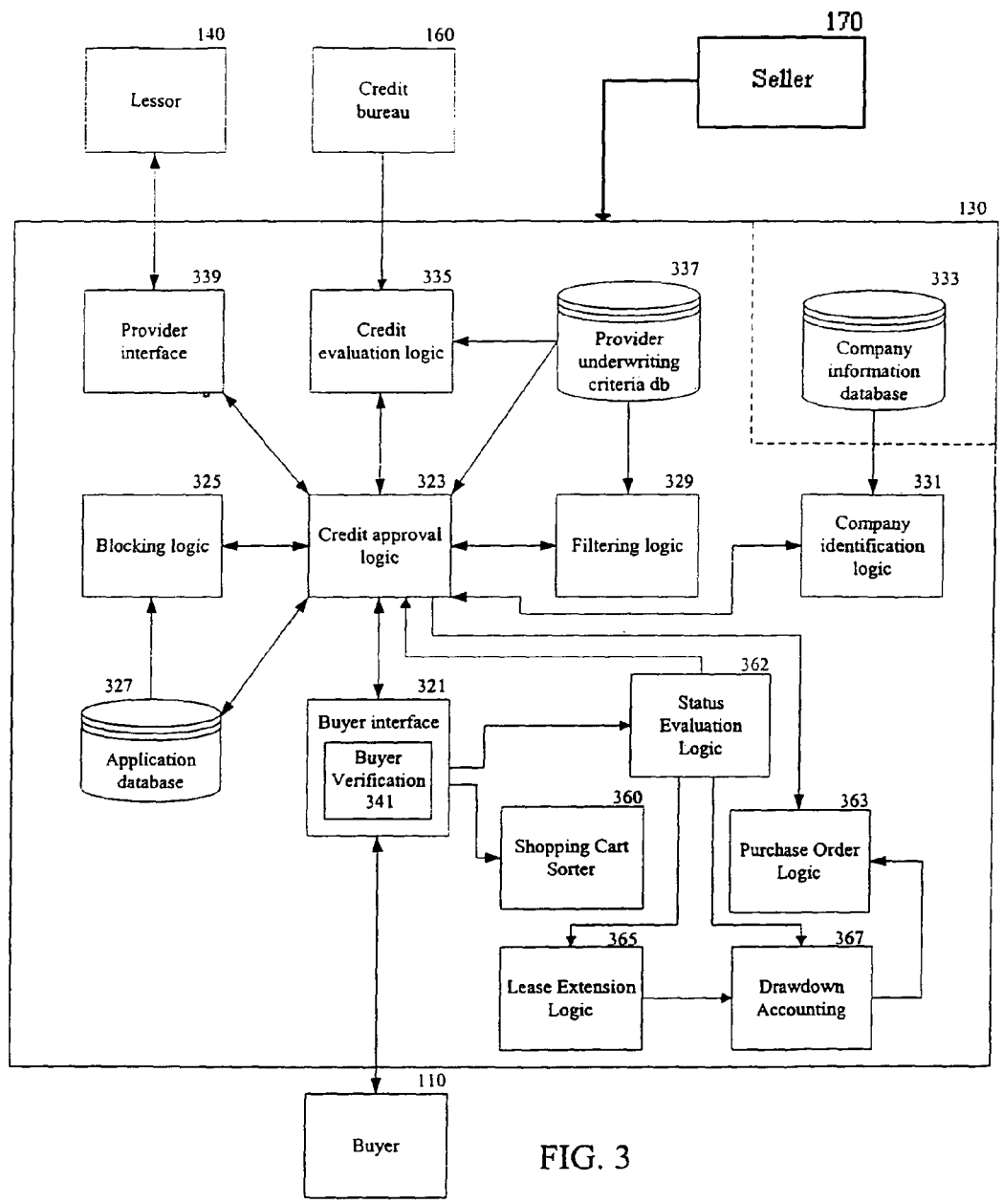
FIG. 3 is a block diagram illustrating one embodiment of a server computer for an online broker and an online seller.

FIG. 3 is a block diagram illustrating one embodiment of a server computer for an online broker 130. The buyer 110 connects to broker 130 through a buyer interface 321.

The broker 130 receives the buyer's data from the seller 170 if there is a sale in progress. The broker 130 communicates to the buyer 110 through a buyer interface 321. Buyer interface 321 includes buyer verification logic 341. Buyer verification logic 341 permits the buyer to securely access the initially approved lease to purchase items. Any security mechanism may be used including encryption, PKI, cookies, passwords, other mechanisms, or a combination thereof.

If the data received from the seller 170 is not enough, the buyer interface 321 sends an interactive application form to the buyer 110 and receives the application data corresponding to message 6 of FIG. 2 from the buyer 110. The application data is transferred to the credit approval logic 323 for evaluation when it is received by the buyer interface 321.

The credit approval logic 323 calls blocking logic 325 to determine if the application should be blocked because of a previous application or because of potential fraud. Certain portions of the application data may trigger fraud evaluation, while other portions trigger past activity evaluation. The blocking logic 325 searches an application database 327 for a record for the buyer 110. If a record is found that indicates the buyer 110 had submitted a previous application, the current buyer may be blocked for a period of time specified in the record. The blocking logic 325 also performs fraud analysis on the application data. When the blocking logic 325 indicates that the application is to be blocked, the credit approval logic 323 returns rejection message 8 to the buyer 110. If a corresponding record is not found, one is created in the database 327 for the buyer.

Assuming the application is not blocked, the credit approval logic 323 calls filtering logic 329 at certain points in the process to determine if the application data collected up to this point disqualifies the buyer 110 from all of the credit options offered by the broker 130, i.e., it performs progressive cumulative filtering. The filtering logic 329 refers to a subset of the underwriting criteria for the credit options stored in a provider underwriting criteria database 337 that corresponds to the application data received. If the buyer 110 does not qualify for at least one of the credit options, the rejection message 8 is returned.

If the buyer 110 is rejected by the broker 130, the buyer interface 321 presents the buyer 110 with a form to fill out to request a written explanation. If such a request is received, the broker 130 provides this written explanation ("adverse action letter"), which can be delivered through email or regular surface mail.

During the application process, the credit evaluation logic 335 may call company identifier logic 331 to search a company information database 333 for a matching company name. The company information database 333 can be local or remote to the broker 130. The company information database 333 may include multiple external databases, such as the databases provided by Experian and Dun & Bradstreet.

Once all the application data has been received, the credit approval logic 323 calls credit evaluation logic 335 to perform the underwriting evaluation that determines for which credit options the buyer 110 is qualified. The credit approval logic 323 obtains the buyer's credit history from credit bureau 160 and determines a credit score for the buyer 110 based on the credit history. In one embodiment, the credit approval logic 323 uses an online credit scoring application to create a credit score for the buyer 110. In an alternate embodiment, the credit approval logic 323 obtains a credit score from the credit bureau 160 that provides the credit history or from a different credit bureau. It will be appreciated that the credit approval logic 323 may obtain more than one type of credit history for an application, e.g., a personal and a business credit history, and also calculate or obtain more than one type of credit score, e.g., a buyer score, a business score, a combined buyer-business score, a credit score for a specific credit product or for a specific credit provider. For one embodiment, the credit history may be received from seller 170. For one embodiment, any data received from seller 170 may be either re-calculated or used in place of data retrieved by the broker 130.

The application data for the buyer 110 is then compared against the underwriting criteria for all the credit options to create a list of qualified credit options, which the credit evaluation logic 335 passes back to the credit approval logic 323 for presentation to the buyer 110 in message 9.

The buyer's choice of credit option in message 10 is received by the application interface 321 and forwarded to the credit approval logic 323. Any additional information that is collected is passed through the application interface 321 for evaluation by the credit evaluation logic 335 or for transfer to the chosen credit provider, i.e., lessor 140, through a provider interface 339. Any additional information that is collected may eliminate the chosen credit option, at which point the credit evaluation logic 335 revises the list of credit options for representation to the buyer 110. The provider interface 339 can send the information to the credit provider, i.e., lessor 140, through the Internet, a private network, an encrypted email, fax, or other means.

Once the buyer 110 has been initially approved (indicating the availability of the lease at least for certain items), the credit approval logic 323 sends the status message 11 to the buyer 110 through the buyer interface 321 and submits the application in message 12 to the chosen-credit provider 140 through the provider interface 339. The credit approval logic 323 also updates a blocking period in the buyer's record in the application database 327 as described in the next section. The purchase order logic 363 prepares a preliminary purchase order, including all of the known data, and stores this information in application database 327. This pre-prepared purchase order is then used, when the buyer 110 applies for an actual lease.

When buyer 110 initially logs into the broker 130's system, status evaluation logic 362 determines whether there is an existing lease, whether there is a lease that should be renewed, or whether the buyer needs to apply for a new lease. This is based on the buyer's identity, as determined by the buyer verification 341.

Shopping cart sorter 360 sorts the items in buyer's shopping cart into leasable goods, for which leasing is available, conditionally leasable goods, for which leasing is available when bought in conjunction with certain leasable goods, and non-leasable goods, for which no leasing options are available. Generally, the designation of a good into one of these categories is done across all lessors. However, for one embodiment, lessors may specify certain items as being leasable, or conditionally leasable, even if they are generally not so designated. For one embodiment, the lessor may specify such items by SKU numbers, or by descriptors. Each lessor may also specify, for one embodiment, sorting rules. Sorting may be by price, by keyword or natural language processing, etc. For example, a lessor may specify that all items above a certain value for a single item may be leasable. Alternative rules, which may be as complex as the lessor desires, may be implemented.

Based on the state as determined by status evaluation logic 362, the sorted data is passed to one of three logics.

If there is an existing lease, the data from the shopping cart sorter 360 is passed to drawdown accounting logic 367. If the credit approval logic 323 provides incremental credit approval, drawdown accounting is performed to provide the lease for the newly acquired leasable goods. The purchase order logic 363 completes the purchase order. For one embodiment, purchase orders are initially started when a lease is applied for, and are completed, when an actual acquisition takes place. When the purchase order is completed by purchase order logic 363, it is sent to the seller 170, as well as to the lessor 140. The drawdown accounting data is sent to the buyer 110 and lessor 140. At this point, the transaction has been completed.

If there is no current valid lease, but there is an expired lease, the data is passed to the lease extension logic 365. Each lessor may provide for conditions under which an expired, or fully used, lease can be extended. A lease can be extended if time has elapsed for its validity, or if the amount for which the lease was approved has been used. Lease extension logic 365, for one embodiment, looks at the preset extension preferences of the lessor 140. For another embodiment, leasing extension logic 365 may further directly contact the lessor 140, to permit remote decisioning on the extension of the lease. If the lease is extended, the process continues the same way as when there is an existing lease. If the lease is not successfully extended, the buyer is given the option to apply for a new lease, for one embodiment. In that instance, the new lease process described above is followed. If there is no existing lease at all, the new lease process is followed as well.

Assuming the lessor 140 or seller 170 requires a signed, physical contract, the lessor 140 or seller 170 sends a contract to the buyer 110. Normally this process will involve the non-automated process of a credit examiner reading the credit information and possibly performing additional diligence. The buyer 110 then reads the contract, completes it, signs it, and returns the executed contract to the lessor 140. Once the contract is signed, the seller 170 provides the purchased items to the buyer 110, and receives any money from the lessor 140. For one embodiment, if the buyer executed a contract with the seller 170, prior to being referred to broker 130, this step may be skipped.

Each lessor 140 periodically provides through the provider interface 339, accounting and other information to the broker 130, regarding which applications were successfully completed and funded. Based on this information, the broker 130 derives a payment from that lessor 140. For one embodiment, the broker 130 may alternatively or additionally derive payment from the seller 170. Thus, accounting functions may be included in the sales interface and provider interface 339 of the broker 130. Additional broker fees may be included in the communication with buyer 110 via buyer interface 321.

The provider interface 339 is also used to collect data for the provider underwriting criteria database 337. Each lessor 140 sends its credit product description and all or a portion of its underwriting criteria to broker 130. The broker 130 stores them in the database 337 and echoes the data back to lessor 140, which then sends confirmation or corrections.

Similarly, when the company information database 333 is local, the broker 130 obtains the name list from one or more credit bureaus 160 and stores it in the database 333.

The system level of the operation of an embodiment of the invention has been described in this section of the detailed description. A seller engages a buyer, and transmits buyer data to an online broker system, if the buyer requests a loan or lease for a purchase. The online broker system collects and evaluates data from a buyer against multiple credit options offered by the broker, and returns a list of credit options for which the buyer qualifies. The buyer chooses a particular credit product and the broker forwards the application data to the associated credit provider. When the application data is made up of several parts, the broker system performs a cumulative progressive filtering at predetermined points in the application process, and rejects the buyer as soon as the application data cumulatively received disqualifies the buyer from all of the multiple credit options. Additional data may be required for the chosen credit option and if the additional data is collected and it disqualifies the buyer from the chosen credit option, the buyer can chose a different credit option from the list. When the lease or loan is obtained by the buyer, as indicated by the broker system, the seller, lessor, and buyer complete the transactions, i.e., the purchase and the lease.

While the invention is not limited to any particular arrangement of software logic modules, one embodiment of modules that perform the processes of the invention has been described. Furthermore, it will be appreciated that the type and order of the messages exchanged between the participants, and the order in which the buyer data is processed can vary from that presented herein without exceeding the scope of the invention.

The methods to be performed by a server computer in FIGS. 1-3 constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or to produce a result.

Figure 4:
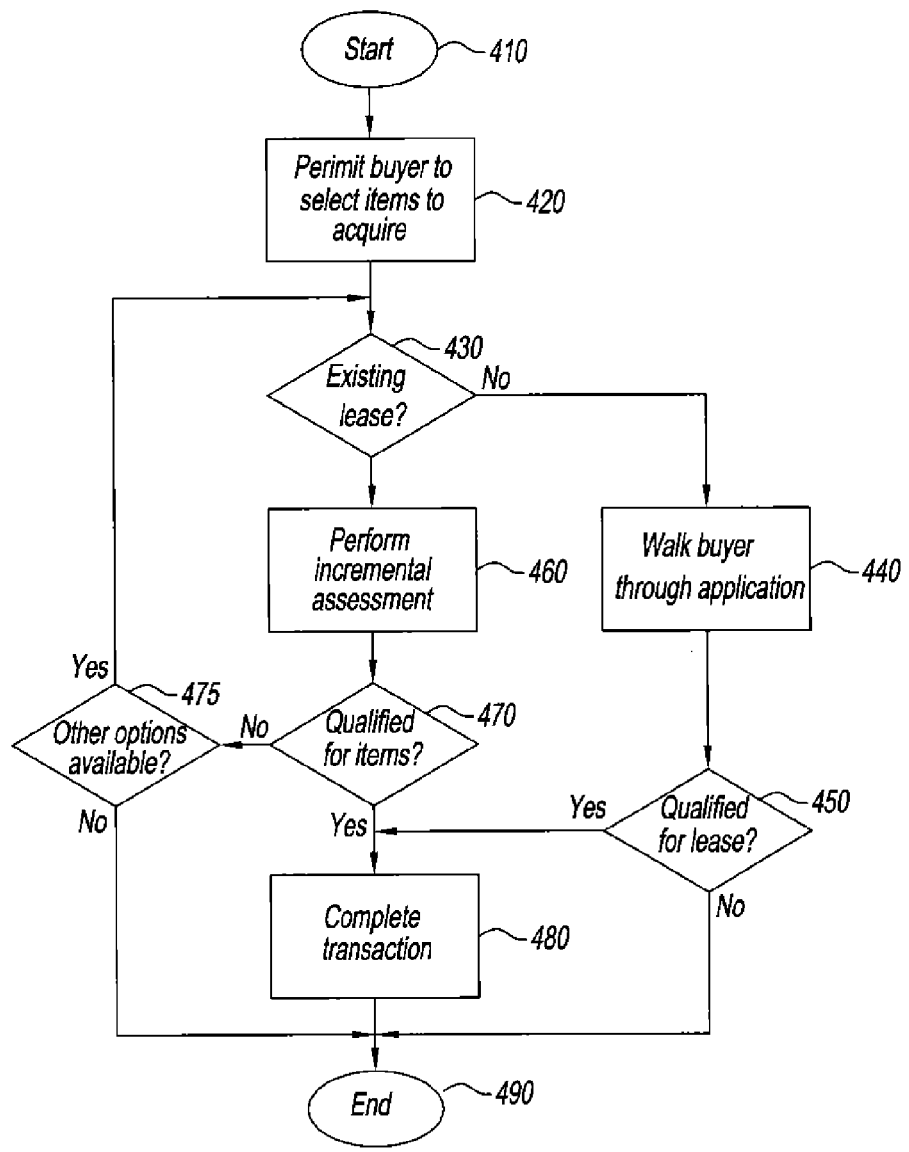
FIG. 4 is an overview flowchart of one embodiment of the point-of-sale leasing method.

FIG. 4 is an overview flowchart. The process starts at block 410. At block 420, the buyer is permitted to acquire items. For one embodiment, this may be in an online store provided by the seller. For example, Dell computers may provide an online store, in which a buyer may pick out various items to acquire by lease. When the buyer is ready to complete the purchase/lease, the process continues to block 430. For one embodiment, the buyer indicates this willingness by pressing the "checkout" or similar button.

At block 430, the process determines whether there is an existing lease. Note that for one embodiment, the buyer may enter the process at this point, avoiding the initial purchase, if he or she wishes to complete a lease application prior to purchasing product.

An existing lease is a lease that has a sufficient amount of money to cover the buyer's acquisition, and which has the buyer's pre-approval.

If there is no existing lease, the process continues to block 440.

At block 440, the buyer is walked through the credit application. For one embodiment, the continuous evaluation method described in co-pending application Ser. No. 09/549, 822 is used to evaluate buyer's eligibility for any available credit options.

At block 450, the process determines whether the buyer was found eligible for the lease. For one embodiment, this evaluation is made continuously throughout the application process, such that applicant is not required to enter further data, if there are no remaining options open.

If there is no lease for which applicant qualifies, the process terminates at block 490. Otherwise, the process continues to block 480.

At block 480, the lease transaction is completed. This is described in more detail below, but the purchase order is completed, the lease is completed, and the buyer, seller, and lessor settle their agreement. For one embodiment, the completion further requires actual signatures. Thus, for one embodiment, the system may require that the buyer actually sign a document. In that case, the transaction completion may proceed in multiple phases. The process then ends at block 490.

If, at block 430, an existing lease was found, the process continued to block 460. At block 460, an incremental credit assessment is performed, to determine whether the lease should be extended to the current purchase. The process of incremental assessment is described in more detail below with respect to FIG. 7B.

At block 470, the system determines whether the buyer is qualified for the items. If so, the process continues to block 480, to complete the transaction.

If, at block 470 the buyer was found to be ineligible for the lease, the process continues to block 475. At block 475, the process evaluates if there are any other options. For example, a buyer may have multiple leases available. If there are other options, the process returns to block 430 to determine whether there are any existing leases available. Otherwise, the process ends, at block 490.

Figure 5:
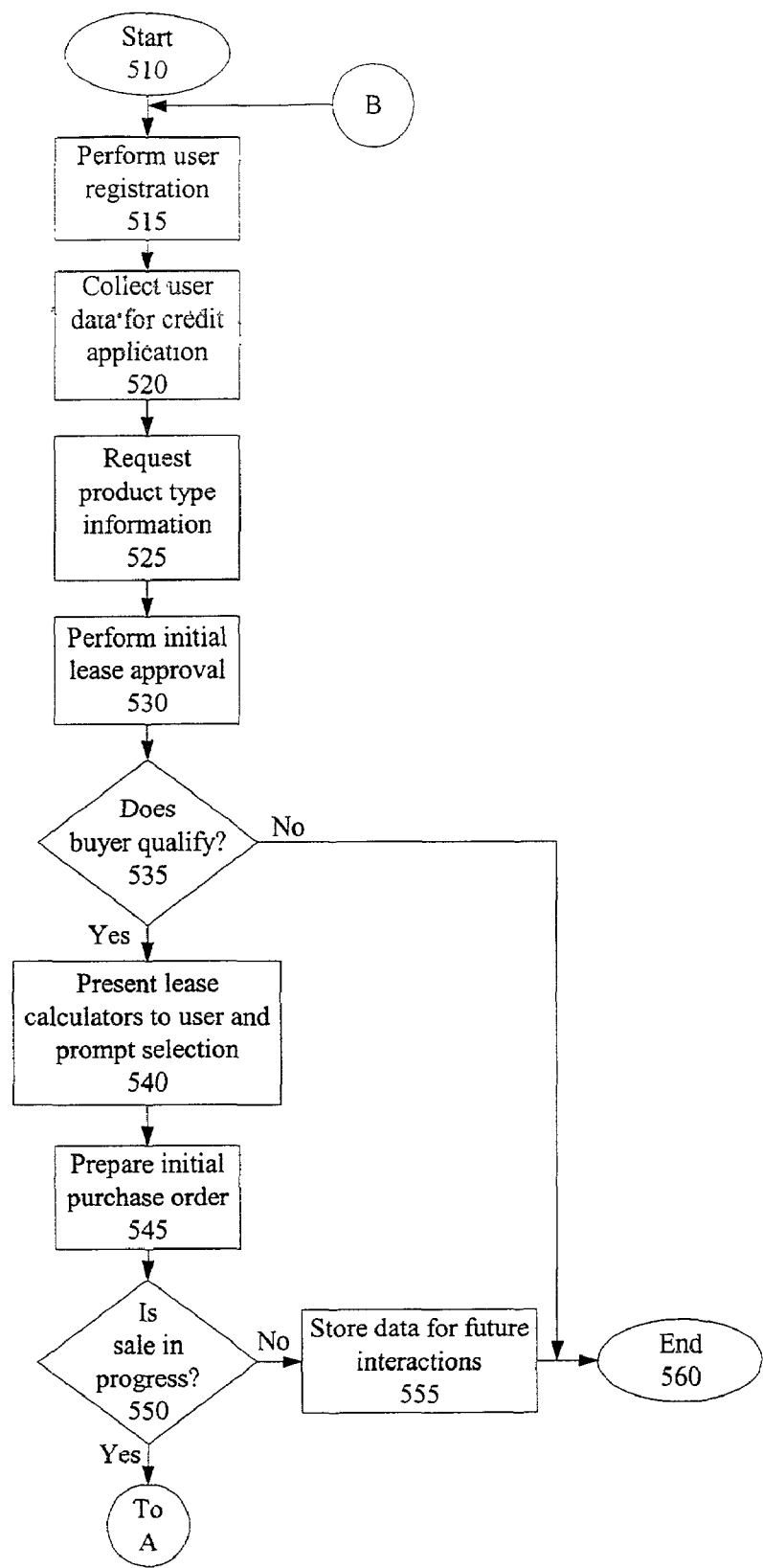
FIG. 5 is a flowchart of one embodiment of initial credit approval.

FIG. 5 is a flowchart of the lease application process. The process starts at block 510. At block 515, user registration is performed. The buyer is asked to identify himself or herself, appropriately, and provide various types of registration information.

At block 520, user data is collected for the credit application. As discussed above, for one embodiment, the evaluation whether the buyer is qualified for credit is performed periodically during the application process. In this way, the process is terminated immediately, if the buyer is not found eligible for the lease.

At block 525, product type information is requested. For one embodiment, this step may be skipped. However, in may instances lessors wish to provide leases only for certain product types. Thus, by specifying the type(s) of products for which leases are being sought, the buyer is providing additional information to identify the proper lessor.

At block 530, the initial lease approval is performed. Note that the term "initial" here refers to the lease approval prior to purchase. As discussed above, this is the final approval step, in which the user qualifies for a lease.

At block 535, the process determines whether the buyer qualifies for the lease. If not, the process ends at block 560. Of course, the buyer may be notified, and if appropriate, a proper rejection notice may be sent to the buyer.

If the buyer qualifies, at block 535, the process continues to block 540.

At block 540, a lease calculator is presented to the user, along with the available lease options, and the user is permitted to make a lease selection. The lease calculator allows the users to determine how and why a specific lease would be best under various circumstances. Since leases may have different terms, depending on the intended use, certain leases may be preferred.

At block 545, after the user selects a lease, the initial purchase order is prepared. The purchase order is the contract between a buyer and a seller, which indicates what items the buyer is acquiring, and various terms of the purchase. Note that in this instance, the buyer is actually the lessor, who is purchasing the item, on the user's or lessee's behalf. However, for simplicity, the term lessor will be applied to the provider of the lease, and thus the purchaser, while the term buyer will be applied to the end user who is acquiring the leased product. The lease agreement between the "buyer" and the lessor may also be prepared at this point, without, of course, the actual amounts, etc.

At block 550, the process determines whether there is a sale in progress. The buyer may be applying for credit after having selected items for purchase. Alternatively, the buyer may be pre-applying for credit, prior to attempting a purchase. If there is a sale in progress, the process continues to Point A, shown on FIG. 6. Otherwise, the process continues to block 555.

At block 555, the data is stored for future interactions. For one embodiment, the buyer may be asked to provide additional authentication for future access to the now pre-approved lease. The process then ends at block 560.

Figure 6:
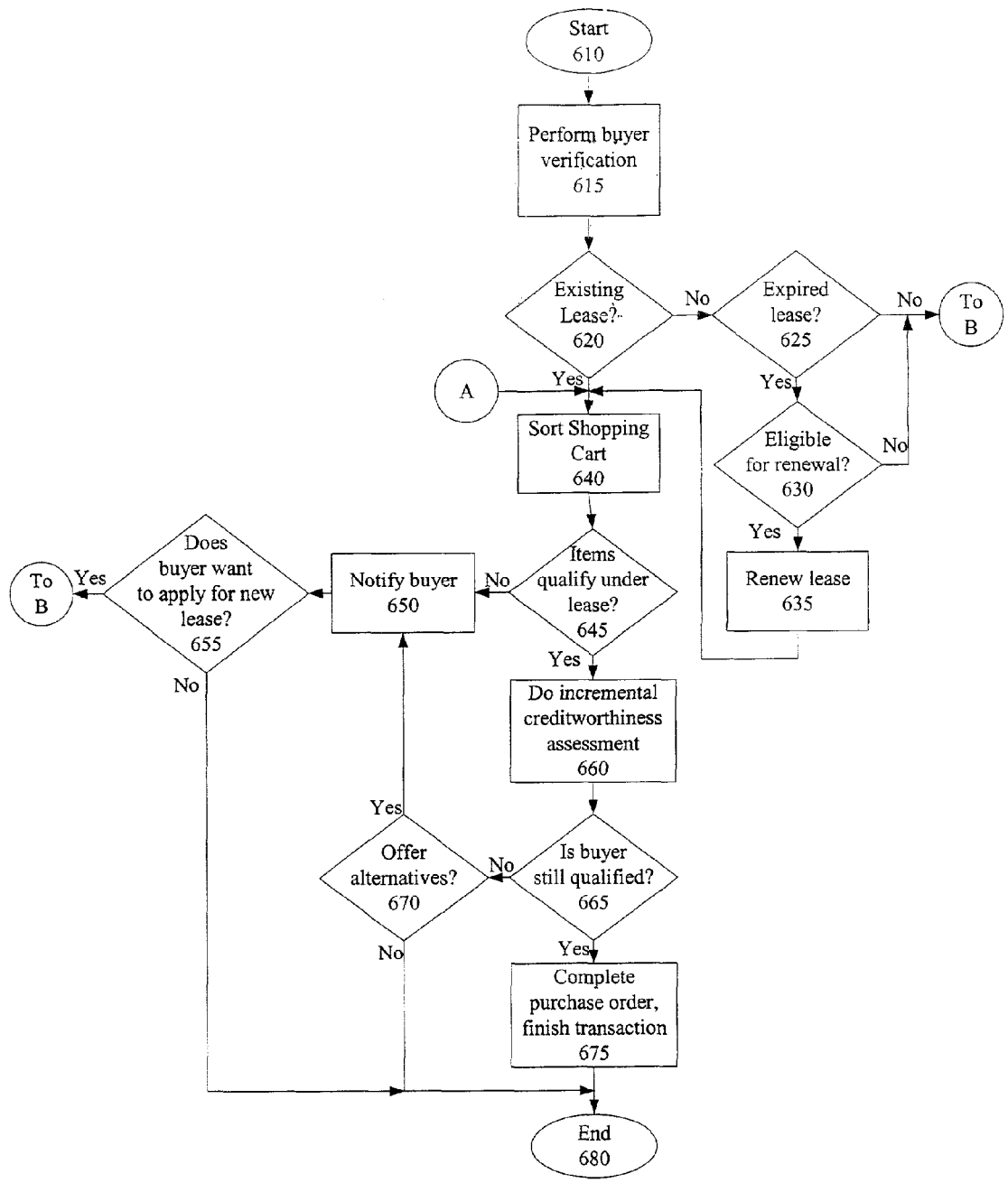
FIG. 6 is a flowchart of one embodiment of transaction completion.

FIG. 6 is a flowchart of one embodiment of processing of a lease. The process starts at bock 610. At block 615, the buyer verification is performed. That is, the buyer is permitted to log into the system. The buyer may indicate that he or she does not have a pre-existing lease.

At block 620, the process determines whether there is an existing lease. If there is no existing lease, the process continues to block 625. At block 625, the process determines whether there is an expired lease. If there is no expired lease either, the process continues to Block B, shown in FIG. 5, as entering the process at block 510.

If there is an expired lease, the process continues to block 630. At block 630, the process determines whether the buyer is eligible for lease renewal. The lease may be renewed when it has expired, as a time duration, or when it does not have sufficient funds remaining. If the buyer is eligible for renewal, the process continues to block 635, to permit the buyer to renew the lease. For one embodiment, this process may be similar to the original application, or more similar to an incremental approval. From block 635, the process then progresses to block 640. If in block 630 the buyer is not eligible for renewal of the lease, the process continues to Block B, shown in FIG. 5.

At block 640, which may be reached from block 620 by an existing lease, or block 635 by a renewed lease, the shopping cart is sorted. The shopping cart sorting is shown in more detail with respect to FIG. 8. The shopping cart is sorted, in accordance with each currently selected lessor's preferences, into leasable goods, non-leasable goods, and conditionally leasable goods.

At block 645, the process determines whether items qualify under the lease. Generally, only items classified as leasable or conditionally leasable qualify under a lease. However, the lessor may have specified special rules for a buyer.

If the items do not qualify under the lease, the process continues to block 650. At block 650, the buyer is notified, that certain (or all) items in their shopping basket do not qualify for the requested lease.

At block 655, the buyer may choose to apply for a new lease, or obtain the items using other means (e.g. purchasing using cash, or other credit options such as credit cards.) If the user chooses to apply for a new lease, the process continues to Block B, shown on FIG. 5. If the buyer does not wish to apply for a new lease, the purchasing process ends at block 680.

In block 645, if the items were determined to qualify under the lease, the process continues to block 660.

At block 660, an incremental credit worthiness assessment is performed. This evaluates the additional credit that should or should not be available to the user, after the initial credit approval. This process is shown in more detail with respect to FIG. 7B.

At block 665, the process determines whether the buyer is still considered qualified for the lease. If so, the process continues to block 675. At block 675, the transaction is completed. The purchase order and the lease agreement are finished. For one embodiment, if signatures are required, the completion may further involve sending physical copies (via fax or mail) and having the copies returned to the appropriate parties. The process then ends at block 680.

If at block 665 the buyer is no longer qualified, the process, at block 670, determines whether alternatives should be offered. For one embodiment, this determination may be based on why the buyer was considered no longer qualified. For example, if the buyer went bankrupt, no other alternatives may be offered. If no alternatives are to be offered, the process continues to block 680, and ends. If other alternatives are to be offered, the process continues to block 650, where the buyer is notified that he did not qualify under the existing lease, and is provided an opportunity to apply for a new lease. For one embodiment, the buyer may set his or her preference whether the option to apply for a new lease should be made available. For one embodiment, the lessor may set his or her preference such that a buyer rejected from a lease under incremental assessment is not informed of the rejection, unless no other options are available.

Figure 7A:
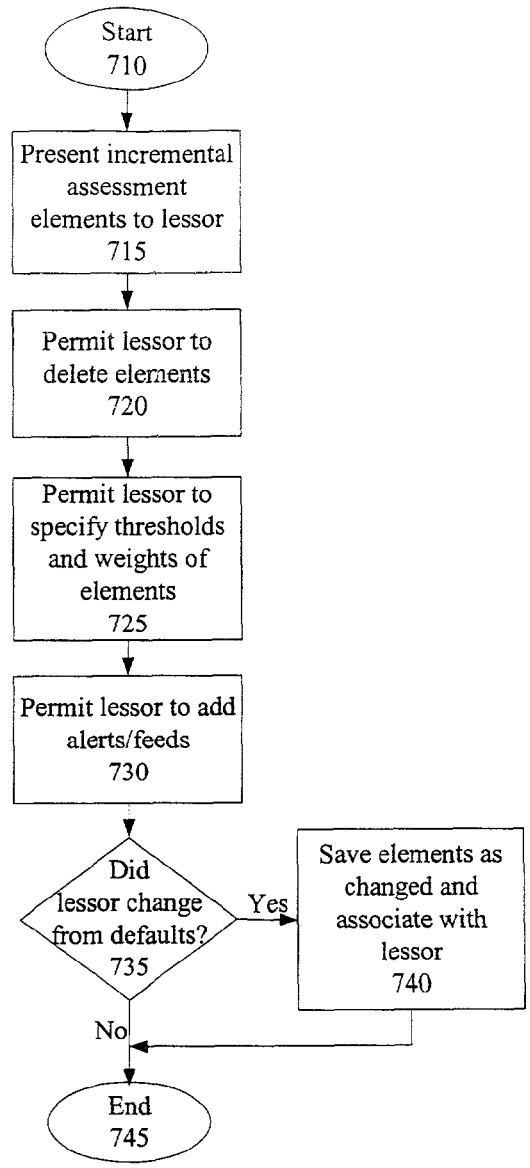
FIG. 7A is a flowchart of one embodiment of setting up elements for incremental creditworthiness evaluation.

FIG. 7A is a flowchart of interacting with the lessor regarding incremental assessments. In order for the incremental assessment to be useful, the lessor is able to adjust various elements. The process starts at block 710.

At block 715, the incremental assessment elements are presented to the lessor. The incremental assessment elements may, for one embodiment, include:

1. The burn rate of the lease, i.e., how fast the buyer is using up the existing lease amount.
2. Repayment timeliness, i.e., how often the buyer is late with a payment.
3. Cyclical patterns, i.e., seasonal or quarterly.
4. Third party data. For one embodiment, third party data is added to the evaluation, and aged out of the evaluation as well. Further, for one embodiment, third party data has a reliability value attached to it. Additional data may be displayed as well.

At block 720, the lessor is allowed to delete elements that are presented. For example, the lessor may choose not to consider cyclical patterns in evaluating the buyer's incremental creditworthiness.

At block 725, the lessor may specify thresholds and weights of the various elements. These thresholds may, for example include:

1. thresholds for interest payment days beyond terms, and associated weightings;
2. thresholds for exception processing, e.g. ignore 2 worst payment events up to 20% of all payment events;
3. time discount factors or thresholds for aging of payment history, e.g. discount history by 90% for each prior month;
4. time discount factors or thresholds for aging third party credit history, i.e., getting new data after 4 months;
5. thresholds for triage to trigger the process of obtaining new third party data, e.g. if the FICO or D&B score is below 420, obtain new credit history, and do new credit worthiness evaluation.

At block 730, the lessor is permitted to add alerts and feeds. Alerts are news sources that may add data such as bankruptcy data about the user into the system. For one embodiment, the lessor may log into the system to transfer such alerts. Alternatively, such alerts may be automatically updated. In yet another embodiment, the news source and search terms may be specified (i.e., bankruptcy, law suit, etc.) and the system automatically monitors the feeds.

At block 735, the system determines whether the lessor changed any of the values/weights/thresholds from the default values shown. If not, the process ends at block 745, and the unchanged thresholds are used for weighted evaluation of the buyer's incremental creditworthiness. If the lessor changed one or more elements, the process continues to block 740. At block 740, the changed elements are saved and associated with the lessor. In that way, the altered equations are used for evaluating the incremental creditworthiness of the buyer.

Figure 7B:
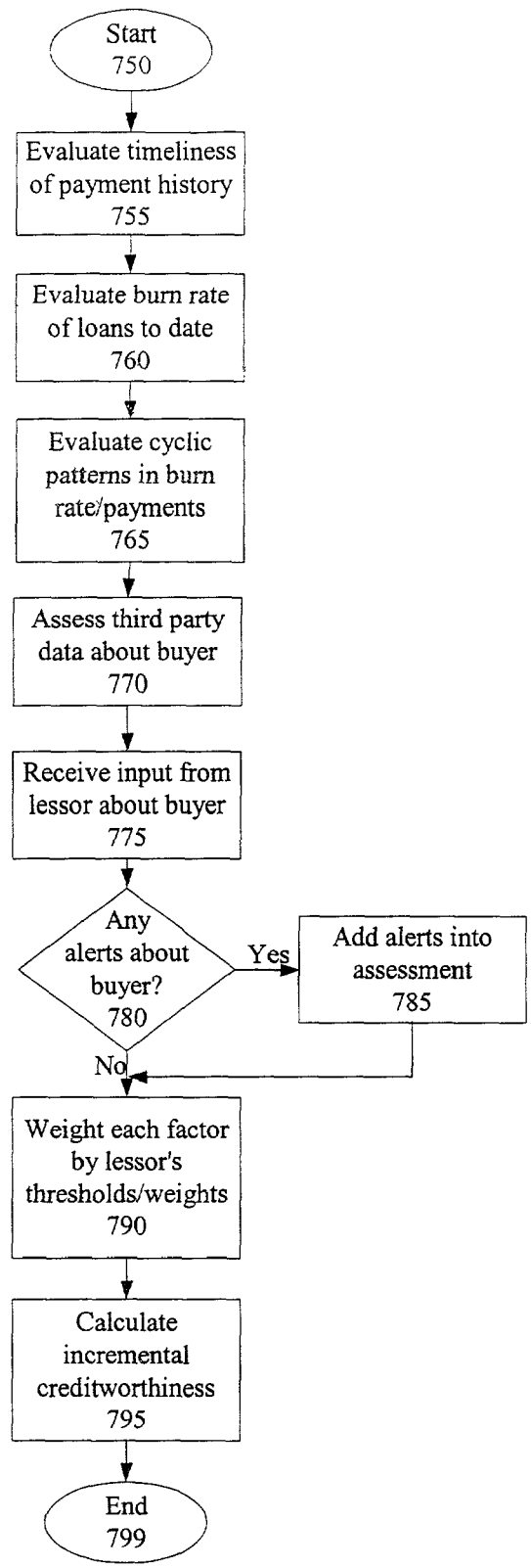
FIG. 7B is a flowchart of one embodiment of performing the incremental creditworthiness evaluation.

FIG. 7B is a flowchart of one embodiment of the incremental creditworthiness evaluation. The process starts at block 750.

At block 755, the timeliness of the payment history is evaluated. Note that this is an evaluation based on a pre-existing lease. Thus, the previous payments on the existing lease are evaluated. As discussed above, the lessor may choose to disregard certain payments (i.e., worst two payments), limit the scope of payment history, or otherwise alter this evaluation. The evaluation takes place after the specific lease in question is identified, thus the appropriate lessor-specific terms and weights are used.

At block 760, the burn rate is evaluated. In general, if a lease is being used very rapidly, there may be an increased risk that the buyer will be unable to pay back the money. A high burn rate may point to an increased risk that an unauthorized person is conducting a fraudulent transaction. Therefore, the burn-rate is evaluated.

At block 765, the cyclic patterns in the payments and lease use are evaluated.

At block 770, third party data is accessed if appropriate. If the third party data is already in the database, it is simply accessed and calculated. If the third party data has expired, in light of the lessor's specifications, it is downloaded, and then added to the equation.

At block 775, input from lessor is evaluated. As discussed above, lessor may periodically add other data about the buyer, which is not available to the system otherwise.

At block 780, the process determines whether there are any alerts about the buyer, either from lessor or from third parties, or sources. If there are none, the process continues directly to block 790. Otherwise, at block 785, the alerts are added into the assessment.

At block 790, each of the factors is weighted in accordance with the specifications of the lessor. Note that the lessor may specify absolute breaking points. For example, if the buyer has declared bankruptcy, the lessor may specify that even if all other factors are positive, this is an absolute block to qualifying for an incremental lease.

At block 795, the incremental creditworthiness of the buyer is finally calculated. This may be a number, representing the creditworthiness of the buyer in light of the information. For another embodiment, this may be a simple yes/no decision, to determine whether the buyer should receive the additional lease for the new items. The process ends at block 799.

Figure 8:
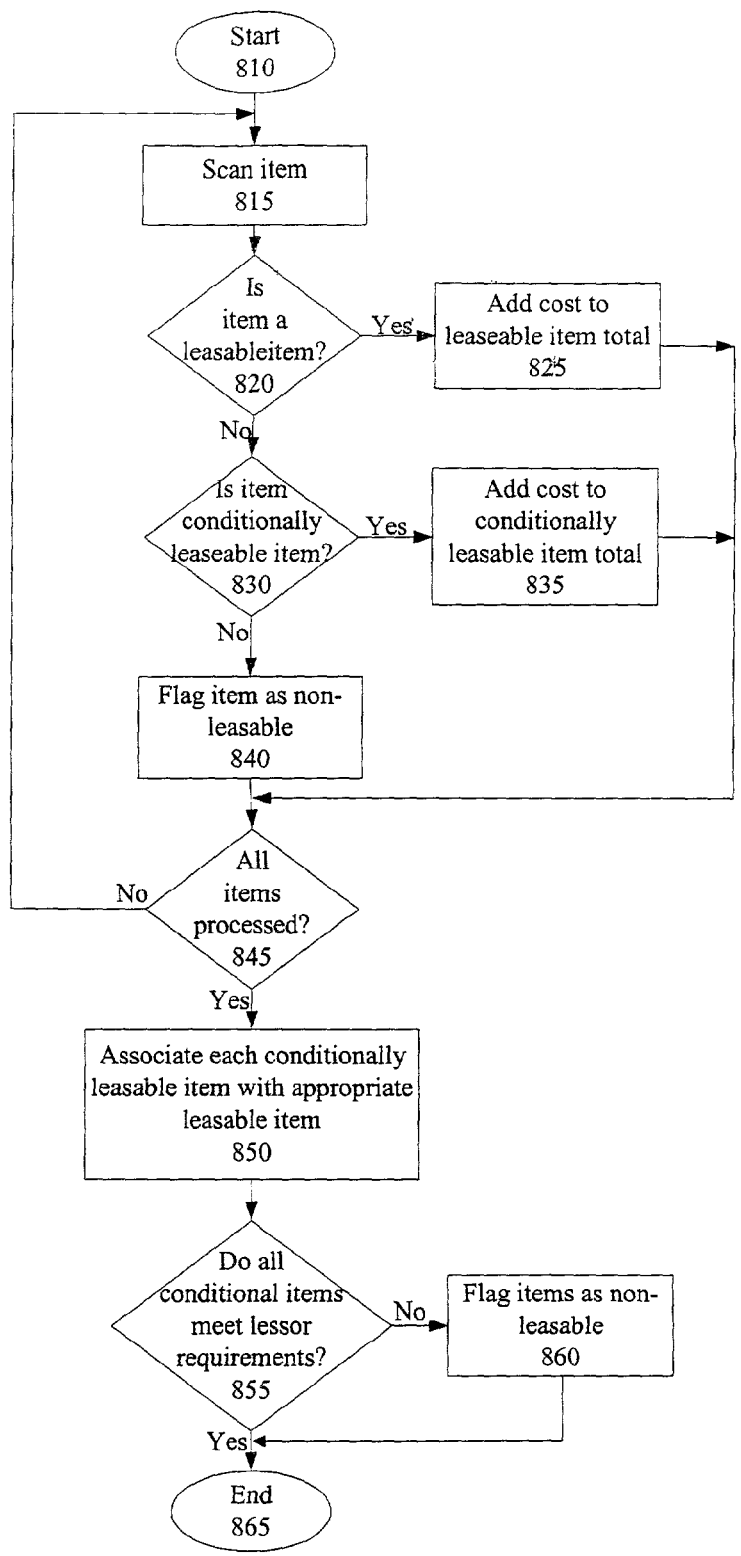
FIG. 8 is a flowchart of one embodiment of shopping card sorting.

FIG. 8 is a flowchart of one embodiment of shopping cart sorting. The process starts at block 810, when the buyer indicates that he or she wishes to obtain credit to acquire the items in the shopping cart. Note that although the term "shopping cart" is used for simplicity, this need not be a conventional shopping cart provided by a shopping site. Rather, this may be simply a listing of SKU numbers, or any other list of one or more items for purchase.

At block 815, the item is scanned. It is assumed that the seller's catalog is machine readable, if not online, and consists of SKU's (independent stock keeping units) each of which has various attributes such as part number (e.g. a string), price (e.g. a dollar amount), a short description, and a long description. For each item in the shopping cart, rules are invoked to scan these attributes to determine whether the item is a leasable item or not. For one embodiment, a default set of rules is identical for all lessors. For one embodiment, the generally accepted accounting practices determine the basic rules. Each lessor, however, may modify the rules. For example, lessors could identify keyword lists, such as a LeasableGoodsKeywords (e.g. computer, copier, monitor, printer . . . ) and a NonLeasableGoodsKeywords (e.g. paper, pencil, ink, suppl(y/ies) . . . ). Each lessor could also specify sorting rules based on price, keyword or natural language processing, SKU numbers, or other basis. The rules may be arbitrarily complex. One example that may be used is:

if (price>$2,500) then leasable
else if (price<$200)
  a. if association with identified leasable good then conditionally leasable
  b. else non-leasable
else if (price>$500)
  a. if (overlap (Short-description & LeasableGoodsKeywords)) then leasable
  b. else if (overlap (Long-description & LeasableGoodsKeywords)
AND NOT
  (Long-description & NonLeasableGoodsKeywords)) then leasable else if (price<$1000)
  a. if (overlap (Short-description & NonLeasableGoodsKeywords)) then
non-leasable
else if (price>$500) then leasable
else non-leasable.

Thus, each scanned item is identified as a leasable item, a non-leasable item, or a conditionally leasable item.

At block 820, the process determines whether the item is a leasable item. If so, the cost is added to the leasable items total at block 825. Otherwise, the process continues to block 830.

At block 830, the process determines whether the item is a conditionally leasable item. If so, the cost is added to the conditionally leasable items, at block 835. If the item is neither a leasable item nor a conditionally leasable item, at block 840, the item is flagged as a non-leasable item. The process then continues to block 845. From blocks 825 and 835, the process also continues directly to block 845.

At block 845, the process determines whether all items in the shopping cart have been processed. If not, the process returns to block 815, to scan the next item in the shopping cart. If so, the process continues to block 850.

At block 850, each conditionally leasable item is associated with an appropriate leasable item. For example, the lessors may specify that conditionally leasable items may be items that are naturally associated with a leasable item. For example, a ream of copier paper may be a conditionally leasable item, if a copier is purchased. Thus, the link between the leasable and conditionally leasable items is made. For another embodiment, the link may simply be cost based. Thus, the lessor may specify that if a certain amount of leasable goods are purchased, a corresponding smaller amount of non-leasable goods may be classified as conditionally leasable, and purchased.

At block 855, the process determines whether all conditionally leasable items meet lessor requirements. This determines whether each conditionally leasable item has a corresponding leasable item, or corresponding value of leasable items. If not, those conditionally leasable goods that are not covered are flagged as non-leasable items, at block 860.

The process then ends at block 865, having resulted in all items in the buyer's shopping cart categorized either as leasable, covered conditionally leasable, or non-leasable. The buyer then may proceed as described above to obtain a lease, or use previously approved lease monies, to obtain the leasable and covered conditionally leasable items. The non-leasable items may be purchased separately, using cash, credit cards, or other credit options.

The above disclosure describes an online point-of-sale leasing system that enables a seller to complete a transaction with a buyer and lessor. By using a credit broker, the buyer is able to apply online for multiple credit products from multiple credit providers. The present invention allows the buyer to complete a purchase using a broker to obtain a lease. This lease may then be used in the present purchase, as well as future purchases, using drawdown accounting.

The present invention allows local decisioning in that the broker has underwriting criteria of each lessor. When an application is received, the broker obtains the credit history information only once to evaluate it against all lessors' criteria to determine the products for which the buyer is qualified. The buyer then chooses one of these products. Thus, the buyer's sensitive information is forwarded only to one chosen lessor as opposed to broadcast decisioning, in which the buyer's data is broadcast to many providers so that they can determine the buyer's eligibility for their products. Local decisioning protects the buyer and increases the speed at which the buyer can be approved.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention.

The terminology used in this application with respect to networks, client computers, and server computers is meant to include all such environments commonly understood by those of skill in the art. Therefore, it is manifestly intended that this invention be limited only by the following claims and equivalents thereof.

What is claimed is:

1. A computerized method performed by a broker system, to provide online credit brokering for point of sale leasing of goods from a lessor to a buyer based upon a sale of said goods from a seller to said lessor, wherein said buyer has a buyer system, said lessor has a lessor system, and said seller has a seller system, said method comprising:

presenting to said buyer system, one or more credit options;

receiving, from said buyer system, a selection of a credit option from said one or more credit options, thus yielding a selected credit option;

performing a credit application approval process, via a computer, by passing credit application data for said buyer through a progressive cumulative filtering, and rejecting said credit application in response to said credit application data failing said progressive cumulative filtering;

qualifying said buyer for said selected credit option in response to said credit application data satisfying underwriting criteria; and notifying said buyer system, said seller system, and said lessor system of an initial approval of a lease to said buyer, in response to said buyer qualifying for said selected credit option.

2. The method of claim 1, further comprising:
  receiving a shopping cart including at least one item intended for leasing; and
  sorting said at least one item in said shopping cart into leasable goods and non-leasable goods.

3. The method of claim 2, further comprising sorting said at least one item into a further category of conditionally leasable goods, wherein conditionally leasable goods are non-leasable goods that are considered leasable as a courtesy.

4. The method of claim 3, wherein each conditionally leasable good is associated with a particular leasable good.

5. The method of claim 3, wherein said lease is only applicable to said leasable goods and said conditionally leasable goods, in response to said conditionally leasable goods corresponding to said leasable goods.

6. The method of claim 1, further comprising:
  validating said buyer in response to said buyer first connecting to a system that performs said method.

7. The method of claim 1, further comprising: upon initial contact with said buyer, classifying a status of said buyer, wherein said status is selected from the group consisting of:
  no existing lease and no pending sale;
  no existing lease and a pending sale; and
  existing lease and pending sale.

8. The method of claim 1, further comprising: transmitting a purchase order for said goods from said lessor to said seller.

9. The method of claim 1, wherein said goods are leasable goods that are classified based on an SKU number, and a description of each good, in accordance with rules set by said lessor.

10. The method of claim 1, further comprising performing an incremental lease approval by:
  evaluating a factor that is payment history of said buyer for said lease;
  evaluating a factor that is a burn rate of said lease;
  evaluating a factor that is cyclic patterns in said burn rate and said payment history;
  evaluating a factor that is third-party data about said buyer;
  receiving a factor that is a datum about said buyer from said lessor;
  assigning a threshold and weight to each of said factors by said lessor; and
  calculating incremental creditworthiness of said buyer according to said threshold and weight of said factors.

11. The method of claim 1, further comprising:
  in response to no sale of goods between said seller and said buyer being in progress, pre-approving said buyer for a lease and offering said goods to said buyer for a future purchase.

12. A non-transitory medium having computer-readable instructions written thereon that are executable by a processor of a broker system to cause said broker system to perform a credit brokering method for point of sale leasing of goods from a lessor to a buyer based upon a sale of goods from a seller to said lessor, wherein said buyer has a buyer system, said lessor has a lessor system, and said seller has a seller system, said method comprising:
  presenting to said buyer system, one or more credit options;
  receiving from said buyer system, a selection of a credit option from said one or more credit options, thus yielding a selected credit option;
  performing a credit application approval process by passing credit application data for said buyer through a progressive cumulative filtering, and rejecting said credit application in response to said credit application data failing said progressive cumulative filtering;
  qualifying said buyer for said selected credit option in response to said credit application data satisfying underwriting criteria; and
  notifying said buyer system, said seller system, and said lessor system of an initial approval of a lease to said buyer, in response to said buyer qualifying for said selected credit option.

13. The non-transitory medium of claim 12, wherein said method further comprises:
  in response to said credit application being not rejected, evaluating said credit application data against underwriting criteria;
  in response to said credit application data satisfying said underwriting criteria, qualifying said buyer for at least one of said one or more credit options; and
  in response to no sale of goods between said seller and said buyer being in progress, pre-approving said buyer for a lease and offering said goods to said buyer for a future purchase.

14. A system for providing online credit brokering for point of sale leasing of goods from a lessor to a buyer based upon a sale of goods from a seller to said lessor, said system comprising:
  a database that stores underwriting criteria; and
  a broker system in communication with said database, a buyer system for said buyer, a seller system for said seller, and a lessor system for said lessor, wherein said broker system performs a process comprising:
    receiving credit application data for a credit application for said buyer;
    presenting to said buyer system, one or more credit options;
    receiving from said buyer system, a selection of a credit option from said one or more credit options, thus yielding a selected credit option;
    progressively cumulatively filtering said credit application data, according to said underwriting criteria;
    rejecting said credit application in response to said credit application data failing said progressively cumulatively filtering;
    qualifying said buyer for said selected credit option in response to said credit application data satisfying said underwriting criteria; and
    notifying said buyer system, said seller system, and said lessor system of an initial lease approval, in response to said buyer qualifying for said selected credit option.

15. The system of claim 14,
  wherein said buyer system is in communication with said seller system, and
  wherein said lessor system is in communication with said seller system.

16. The system of claim 15,
  wherein said broker system communicates purchasing options from said seller system to said buyer system, and
  wherein said purchasing options are computed from data of said buyer system.

17. The system of claim 16, further comprising:
  generating a preliminary purchase order; and
  storing said purchase order in said database.

* * * * *